United States Patent
Zhang et al.

(10) Patent No.: US 10,887,851 B1
(45) Date of Patent: Jan. 5, 2021

(54) DYNAMIC TRANSMISSION POWER IN WIRELESS MESH NETWORKS USING SUPERVISED AND SEMI-SUPERVISED LEARNING

(71) Applicant: Cisco Technology, Inc., San Jose, CA (US)

(72) Inventors: Lele Zhang, Shanghai (CN); Huimin She, Shanghai (CN); Wenchuan Ji, Shanghai (CN); Chuanwei Li, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/521,184

(22) Filed: Jul. 24, 2019

(51) Int. Cl.
*H04M 1/00* (2006.01)
*H04W 52/36* (2009.01)
*G05B 13/02* (2006.01)
*H04W 24/08* (2009.01)
*H04W 84/18* (2009.01)

(52) U.S. Cl.
CPC ...... *H04W 52/367* (2013.01); *G05B 13/0265* (2013.01); *H04W 24/08* (2013.01); *H04W 84/18* (2013.01)

(58) Field of Classification Search
CPC ... H04W 52/367; H04W 24/08; H04W 84/18; G05B 13/0265
USPC .......................................................... 455/522
See application file for complete search history.

(56) References Cited

U.S. PATENT DOCUMENTS

| | | | | |
|---|---|---|---|---|
| 8,036,186 | B2 * | 10/2011 | Gupta | H04W 52/267 370/338 |
| 9,630,318 | B2 * | 4/2017 | Ibarz Gabardos | B25J 9/1697 |
| 10,131,052 | B1 * | 11/2018 | Ibarz Gabardos | B25J 9/161 |
| 2002/0022483 | A1 * | 2/2002 | Thompson | H04L 63/0272 455/439 |
| 2006/0165103 | A1 * | 7/2006 | Trudeau | H04L 12/2854 370/401 |

(Continued)

OTHER PUBLICATIONS

U.S. Appl. No. 15/927,014, filed Mar. 20, 2018, Cisco Technology Inc.
Balevi et al., "Optimizing the Number of Fog Nodes for Cloud-Fog-Thing Networks", arxiv.org, Jan. 2, 2018, pp. 1-17.
Xie et al., "Adaptive Transmission Power in Low-Power and Lossy Network", Technical Disclosure Commons, Defensive Publications Series, Sep. 25, 2018, 7 pages.

(Continued)

*Primary Examiner* — April G Gonzales
(74) *Attorney, Agent, or Firm* — Behmke Innovation Group LLC; James J. Wong; Jonathon P. Western

(57) ABSTRACT

In one embodiment, a technique for dynamic transmission power in wireless mesh networks using supervised and semi-supervised learning is provided. A first device of a mesh communication network may receive a set of transmission power metrics indicative of network conditions between a second device of the mesh communication network and a plurality of child nodes associated with the second device. The first device may provide the set of transmission power metrics as input to a supervised machine learning process that probabilistically determines one or more minimum transmission power thresholds for nodes of the mesh communication network. The first device may obtain an output from the supervised machine learning process comprising an indication of a particular minimum transmission power threshold for the second device. The first device may control the second device to exchange packets with the plurality of child nodes using the particular minimum transmission power threshold.

20 Claims, 12 Drawing Sheets

(56) References Cited

U.S. PATENT DOCUMENTS

| | | | | |
|---|---|---|---|---|
| 2012/0317619 A1* | 12/2012 | Dattagupta | ........... | H04W 12/08 726/4 |
| 2014/0044041 A1* | 2/2014 | Moshfeghi | ........... | H04B 7/0456 370/328 |
| 2014/0064257 A1* | 3/2014 | Fontaine | ........... | H04W 74/0891 370/336 |
| 2014/0334336 A1* | 11/2014 | Chen | ..................... | H04W 16/24 370/254 |
| 2015/0094114 A1* | 4/2015 | Rao | .................... | H04W 52/245 455/522 |
| 2016/0036572 A1* | 2/2016 | Bhanage | ............... | H04W 16/28 370/329 |
| 2016/0374078 A1* | 12/2016 | Ghosh | .................. | H04W 16/10 |
| 2018/0011704 A1* | 1/2018 | Middleton | ............... | H04B 1/38 |
| 2018/0124632 A1* | 5/2018 | Thubert | .................. | H04L 47/34 |
| 2018/0181088 A1* | 6/2018 | Kelly | .................... | G06F 9/5072 |
| 2018/0220283 A1* | 8/2018 | Condeixa | ........... | H04W 28/021 |
| 2018/0288695 A1* | 10/2018 | Tchigevsky | ........... | H04W 48/20 |
| 2019/0215838 A1* | 7/2019 | Henry | .................. | H04W 24/02 |
| 2019/0297004 A1* | 9/2019 | Fenoglio | ............... | H04L 45/123 |

OTHER PUBLICATIONS

"Bayes' theorem", online: https://en.wikipedia.org/wiki/Bayes%27_theorem, dated Oct. 13, 2019, printed Nov. 8, 2019, 14 pages, Wikimedia Foundation Inc.

"Naive Bayes classifier", online: https://en.wikipedia.org/wiki/Naive_Bayes_classifier, dated Nov. 5, 2019, printed Nov. 8, 2019, 10 pages, Wikimedia Foundation Inc.

Gerardnico, "Data Mining—Naive Bayes (NB)", https://gerardnico.com/data_mining/naive_bayes, dated Jun. 5, 2018, 14 pages.

"1.9. Naive Bayes", online: https://scikit-learn.org/stable/modules/naive_bayes.html, scikit-learn developers, printed Nov. 8, 2019, 4 pages.

Karunaratne et al., "An Overview of Machine Learning Approaches in Wireless Mesh Netowrks," https://arxiv.org/ftp/arxiv/papers/1806/1806.10523.pdf, Jun. 27, 2018.

Chincoli et al., "Self Learning Power Control in Wireless Sensor Networks," http://www.mdpi.com/1424-8220/18/2/375/pdf, Jan. 27, 2018, 29 pages.

\* cited by examiner

US 10,887,851 B1

DYNAMIC TRANSMISSION POWER IN WIRELESS MESH NETWORKS USING SUPERVISED AND SEMI-SUPERVISED LEARNING

TECHNICAL FIELD

The present disclosure relates generally to computer networks, and, more particularly, to dynamic transmission power in wireless mesh networks using supervised and semi-supervised learning.

BACKGROUND

Many network communication protocols have been defined over the years based on particular situations, such as for large-scale networks, wireless networks, low-power and lossy networks (LLNs), and, in particular, industrial automation. LLNs, such as those utilized in Internet of Things (IoT) mesh network deployments, face a number of communication challenges. Unfortunately, such networks oftentimes communicate over a wireless communication medium (e.g., radiofrequency) that is strongly affected by environmental conditions that change over time. Some examples include temporal changes in interference (e.g. other wireless networks or electrical appliances), physical obstruction (e.g. doors opening/closing or seasonal changes in foliage density of trees), and propagation characteristics of the physical media (e.g. temperature or humidity changes).

In an attempt to address these communication challenges, mesh network nodes are typically configured to use a maximum transmission power threshold (i.e., a default transmission power) for all of its communications. In particular, the maximum transmission power threshold is typically set to a fixed and pre-configured value (at a modulation level) according to and allowed by national rules and regulations (e.g., FCC standards). By always using the maximum transmission power threshold, the mesh network nodes may unnecessarily consume power during transmission of packets to other nodes, even though the transmission of packets would succeed at a lower transmission power threshold. Additionally, the use of the maximum transmission power threshold for communications may unintentionally cause a given mesh network node to interfere with communications of neighboring nodes (e.g., a mesh network node may broadcast beyond the range necessary for communication with nodes it is associated with).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
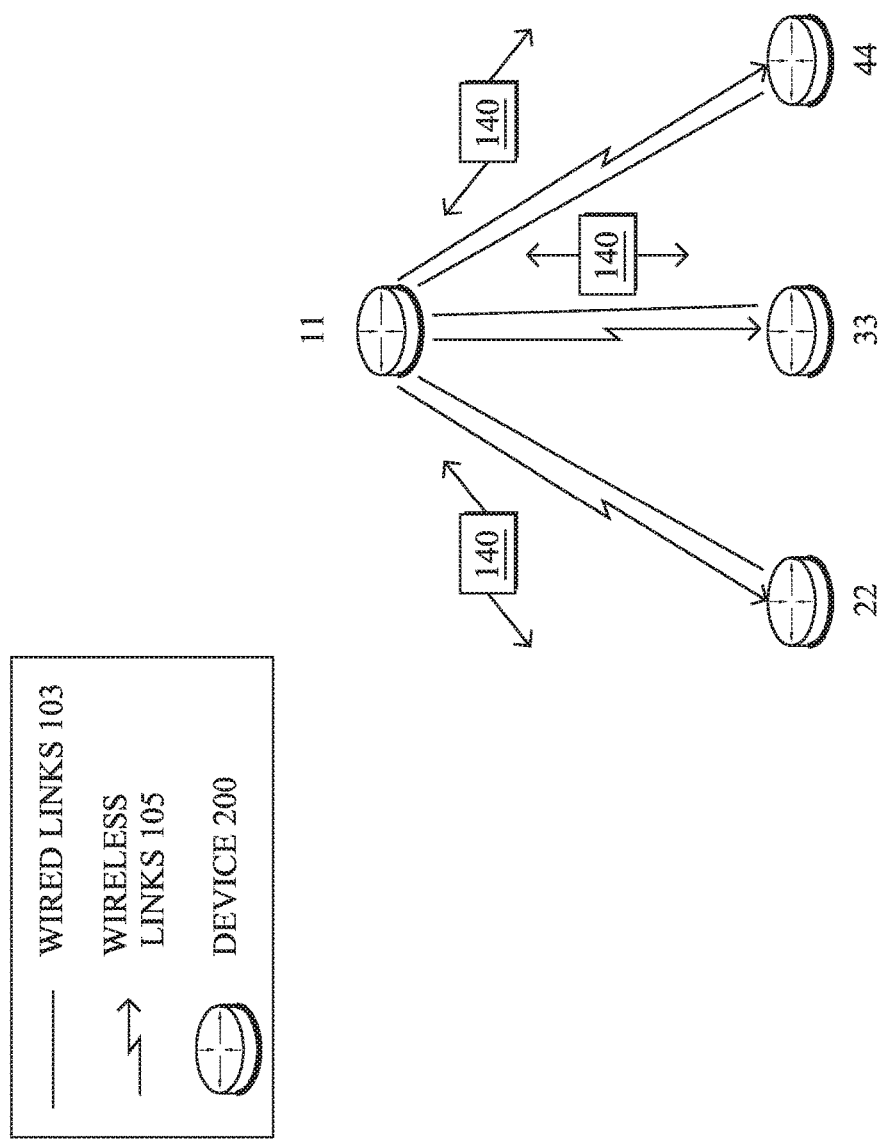
FIG. 1 illustrates an example schematic block diagram of a simplified computer network in one embodiment of the present disclosure.

According to one or more embodiments of the disclosure, a technique for dynamic transmission power in wireless mesh networks using supervised and semi-supervised learning is provided. A first device of a mesh communication network may receive a set of transmission power metrics that are indicative of network conditions between a second device of the mesh communication network and a plurality of child nodes that are associated with the second device. The first device may provide the set of transmission power metrics as input to a supervised machine learning process that probabilistically determines one or more minimum transmission power thresholds for nodes of the mesh communication network. The first device may obtain an output from the supervised machine learning process comprising an indication of a particular minimum transmission power threshold for the second device. The first device may control, based on the output from the supervised machine learning process, the second device to exchange one or more packets with the plurality of child nodes using the particular minimum transmission power threshold.

In another embodiment, a first device of a mesh communication network that is associated with a plurality of child nodes may send a set of transmission power metrics that are indicative of network conditions between the first device and plurality of child nodes to a second device of the mesh communication network. The first device may receive an indication of a particular minimum transmission power threshold for the first device, wherein the particular minimum transmission power threshold is output of a supervised machine learning process that probabilistically determines one or more minimum transmission power thresholds for nodes of the mesh communication network by using the set of transmission power metrics as input. The first device may exchange one or more packets with the plurality of child nodes using the particular minimum transmission power threshold.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE 1901.2, and others. A wireless network, in particular, is a type of shared media network where a plurality of nodes communicates over a wireless medium, such as, for example, using radio frequency (RF) transmission through the air. For example, a Mobile Ad-Hoc Network (MANET) is a kind of wireless ad-hoc network, which is generally considered a self-configuring network of mobile routes (and associated hosts) connected by wireless links, the union of which forms an arbitrary topology. For instance, Low power and Lossy Networks (LLNs), e.g., certain sensor networks, may be used in a myriad of applications such as for "Smart Grid" and "Smart Cities" (e.g., for Advanced Metering Infrastructure or "AMI" applications) and may often consist of wireless nodes in communication within a field area network (FAN). LLNs are generally considered a class of network in which both the routers and their interconnects are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

FIG. 1 is a schematic block diagram of an example (and vastly simplified) computer network 100 (e.g., wireless and/or wired) illustratively comprising nodes/devices 200 (e.g., labeled as shown, "11," "22," "33," and "44") interconnected by communication links 103 and 105, as described below. In particular, certain nodes 200, such as, for example, routers, sensors, computers, radios, etc., may be in communication with other nodes 200, for example, based on distance, signal strength, current operational status, location, etc. Those skilled in the art will understand that any number of nodes, devices, links, etc. may be used in the wireless or wired network, and that the view shown herein is for simplicity (particularly, that while routers are shown, any wireless communication devices 11-44 may be utilized). Also, while the embodiments are illustratively shown herein with reference to a generally wireless network, the description herein is not so limited, and may be applied to networks that have wired links, wireless links, PLC links, etc.

Data transmissions 140 (e.g., traffic, packets, messages, etc. sent between the devices/nodes) may be exchanged among the nodes/devices of the computer network 100 using predefined network communication protocols such as certain known wireless protocols (e.g., IEEE Std. 802.15.4, WiFi, Bluetooth®, RF, etc.) or other shared media protocols where appropriate (e.g., PLC). As described herein, the communication may, in one embodiment, be based on dual PHY links such as, for example, links 103 and 105 (e.g., RF links and PLC links), or, generally, "multi-PHY" (for two or more different types of communication links). As used herein, PHY refers to the physical layer of the OSI model. In this context, a protocol consists of a set of rules defining how the nodes interact with each other.

Figure 2:
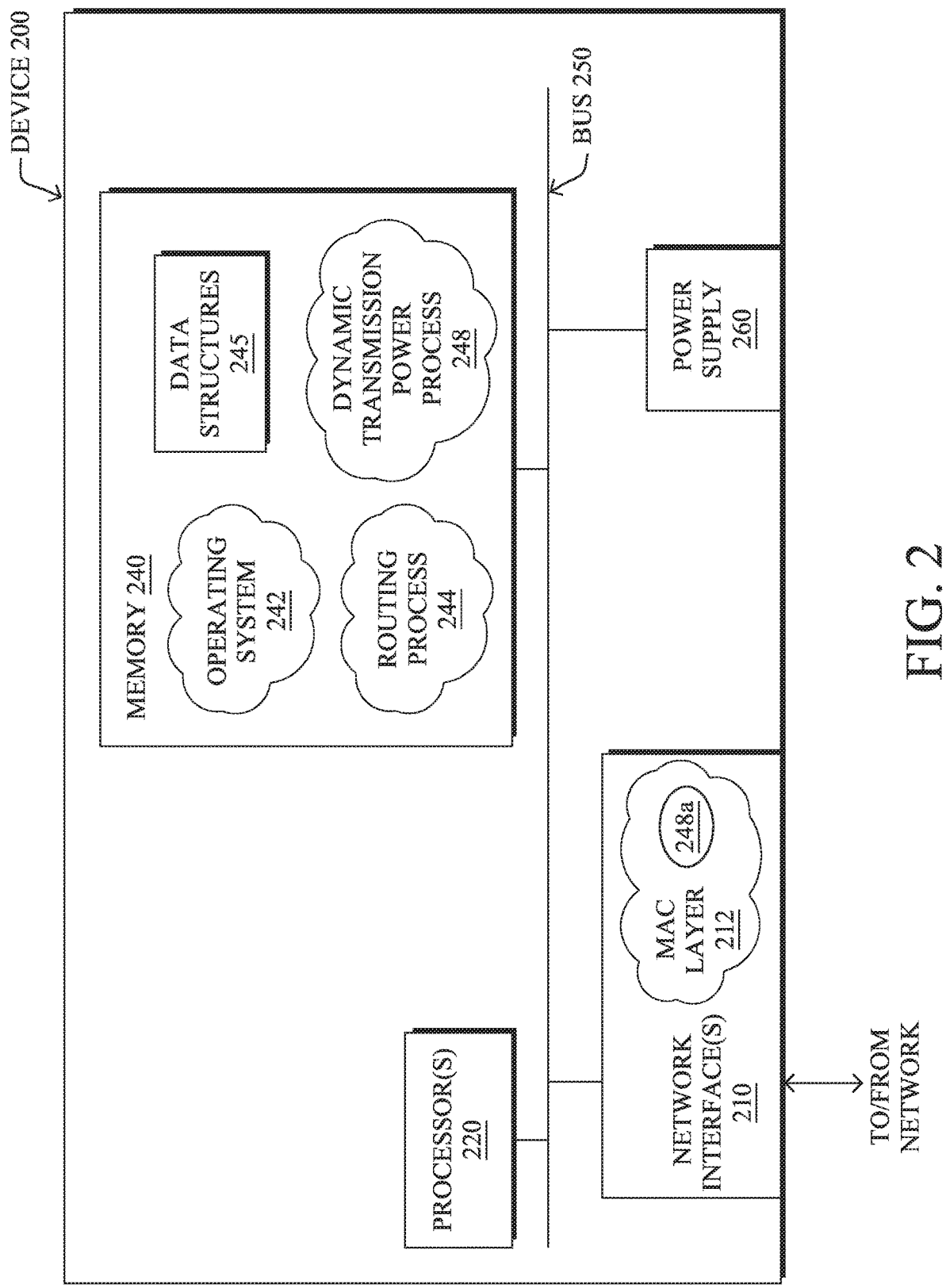
FIG. 2 illustrates an example schematic block diagram of an example device in one embodiment of the present disclosure.

FIG. 2 is a schematic block diagram of an example device 200 (e.g., an apparatus) in accordance with one embodiment of the present disclosure. The device 200 may be a node used with one or more embodiments described herein, e.g., as nodes 11-44. The device 200 may comprise one or more network interfaces 210 (e.g., a wireless link, an RC link, a PLC link, etc.), at least one processor 220, and a memory 240 interconnected by a system bus 250, as well as a power supply 260 (e.g., plug-in, battery, etc.).

The network interface(s) 210, for example, transceivers, contain the mechanical, electrical, and signaling circuitry for communicating data over wireless links and/or wired links coupled to the network 100. The network interface 210 may be configured to transmit and/or receive data using a variety of different communication protocols. The network interface may also be configured to support dual PHY based communication. In addition, the interface 210 may comprise an illustrative media access control (MAC) layer module 212 (and other layers, such as the physical or "PHY" layer, as will be understood by those skilled in the art). Note, further, that the nodes may have two or more different types of network interfaces 210, namely, wireless and/or wired/physical connections, and that the example FIG. 2 herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and a dynamic transmission power process 248. Note that while the dynamic transmission power process 248 is shown in centralized memory 240, alternative embodiments provide for the dynamic transmission power process 248 to be specifically operated within the network interfaces 210, such as a component of MAC layer 212 (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (e.g., a data structure 245) containing, e.g., data used to make routing/forwarding decisions. In particular, in proactive routing, connectivity is discovered and known prior to computing routes to any destination in the network, for example, link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), Dynamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

The device 200 as described herein may be part of the LLN discussed previously. An example implementation of LLNs is an "Internet of Things" network. As described above, the term "Internet of Things" or "IoT" may be used by those in the art to refer to uniquely identifiable objects or "things" and their virtual representations in a network-based architecture. In particular, the term "IoT" generally refers to the interconnection of objects (for example, smart objects), such as sensors and actuators, over a computer network (for example, IP), which may be the Public Internet or a private network. Such devices have been used in the industry for decades, usually in the form of non-IP or proprietary protocols that are connected to IP networks by way of protocol translation gateways. With the emergence of a myriad of applications (e.g., smart grid, smart cities, building and industrial automation, etc.), it has been of the utmost importance to extend the IP protocol suite for these networks.

Smart object networks, such as sensor networks, in particular, are a specific type of LLN having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver (such as, for example, RF transceiver) or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

In general, and as described in greater detail below, the dynamic transmission power service provided by the dynamic transmission power process 248 may identify and determine one or more minimum power thresholds for nodes of a mesh communication network. To do so, in various embodiments, the dynamic transmission power process 248 may use machine learning techniques. In general, machine learning is concerned with the design and the development of techniques that take as input empirical data (such as network statistics and performance indicators), and recognize complex patterns in these data. One very common pattern among machine learning techniques is the use of an underlying model M (e.g., a supervised, un-supervised, or semi-supervised model), whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

Example machine learning techniques that dynamic transmission power process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

—Dynamic Transmission Power in Wireless Mesh Networks Using Supervised and Semi-Supervised Learning—

As noted above, an individual mesh communication network may include thousands of nodes. Consequently, each node in the network may have hundreds of neighbors within transmission range of the node. Despite the possibility of the node having hundreds of neighbors, nodes in individual mesh communication networks are typically configured to use a maximum transmission power threshold (i.e., a "default" transmission power) for all of its communications. In particular, the maximum transmission power threshold is typically set to a fixed and pre-configured value (at a modulation level) up to levels that are allowed by national rules and regulations (e.g., FCC standards). The nodes are configured to use the maximum transmission power threshold in an attempt to mitigate unknown and uncontrolled factors (e.g., radio interference, density of deployments, etc.) that may affect the connectivity of the nodes in varying deployments of individual mesh communication networks (e.g., outdoor environments, factory/assembly line settings, etc.). By always using the maximum transmission power threshold, nodes may unnecessarily consume power for transmission of packets to other nodes, even though the transmission of packets may succeed at a lower transmission power threshold (e.g., the communication may transmit at the same throughput, latency, etc.). Additionally, use of the maximum transmission power threshold may unintentionally cause a node to interfere with communications of neighboring nodes (e.g., the node may be broadcasting beyond the range necessary for communication with nodes it is associated with, transmission ranges of two nodes may overlap thereby causing collisions when the two nodes exchange data with child nodes, etc.). In addition, collisions in communications increase despite conventional interference mitigation measures like frequency hopping.

The techniques herein, therefore, enable dynamic transmission power in wireless mesh networks using supervised and semi-supervised learning. In particular, a wireless mesh node may be configured to tune (e.g., "throttle down") its transmission power threshold in a manner that allows the wireless mesh node to maintain connectivity with child nodes while ensuring adequate throughput (i.e., substantially the same as would be provided when using the maximum transmission power threshold). Consequently, unnecessary energy consumption by the wireless mesh node is reduced and a "cleaner" overall radio environment for a given wireless mesh network may be achieved. To this end, the techniques herein leverage machine learning and fog computing principles. In particular, a supervised machine learning process (e.g., based on Bayes' theorem) may, given network conditions of a mesh communication network, identify and/or determine minimum transmission power thresholds for nodes in the mesh communication network. Further, a semi-supervised machine learning process (e.g., reinforcement learning) may be implemented as to dynamically update the identified and/or determined minimum transmission power thresholds as new information regarding the network conditions of the mesh communication is obtained. Fog computing provides individual mesh nodes (e.g., endpoint nodes) with limited computing performance in the mesh computing network to offload the computing calculations required for the above-described machine learning processes to nodes, for example, sub-root nodes or border routers, that have the computer performance more well-suited for the machine learning processes.

Specifically, according to one or more embodiments of the disclosure as described in detail below, a first device of a mesh communication network may receive a set of transmission power metrics that are indicative of network conditions between a second device of the mesh communication network and a plurality of child nodes that are associated with the second device. The first device may provide the set of transmission power metrics as input to a supervised machine learning process that probabilistically determines one or more minimum transmission power thresholds for nodes of the mesh communication network. The first device may obtain an output from the supervised machine learning process comprising an indication of a particular minimum transmission power threshold for the second device. The first device may control, based on the output from the supervised machine learning process, the second device to exchange one or more packets with the plurality of child nodes using the particular minimum transmission power threshold.

In another embodiment as described herein, a first device of a mesh communication network that is associated with a plurality of child nodes may send a set of transmission power metrics that are indicative of network conditions between the first device and plurality of child nodes to a second device of the mesh communication network. The first device may receive an indication of a particular minimum transmission power threshold for the first device, wherein the particular minimum transmission power threshold is output of a supervised machine learning process that probabilistically determines one or more minimum transmission power thresholds for nodes of the mesh communication network by using the set of transmission power metrics as input. The first device may exchange one or more packets with the plurality of child nodes using the particular minimum transmission power threshold.

Illustratively, the techniques described herein may be performed by hardware, software, and/or firmware, such as in accordance with the dynamic transmission power process 248, which may include computer executable instructions executed by the processor 220 (or independent processor of interfaces 210) to perform functions relating to the techniques described herein, for example, in conjunction with routing process 244.

Figure 3A:
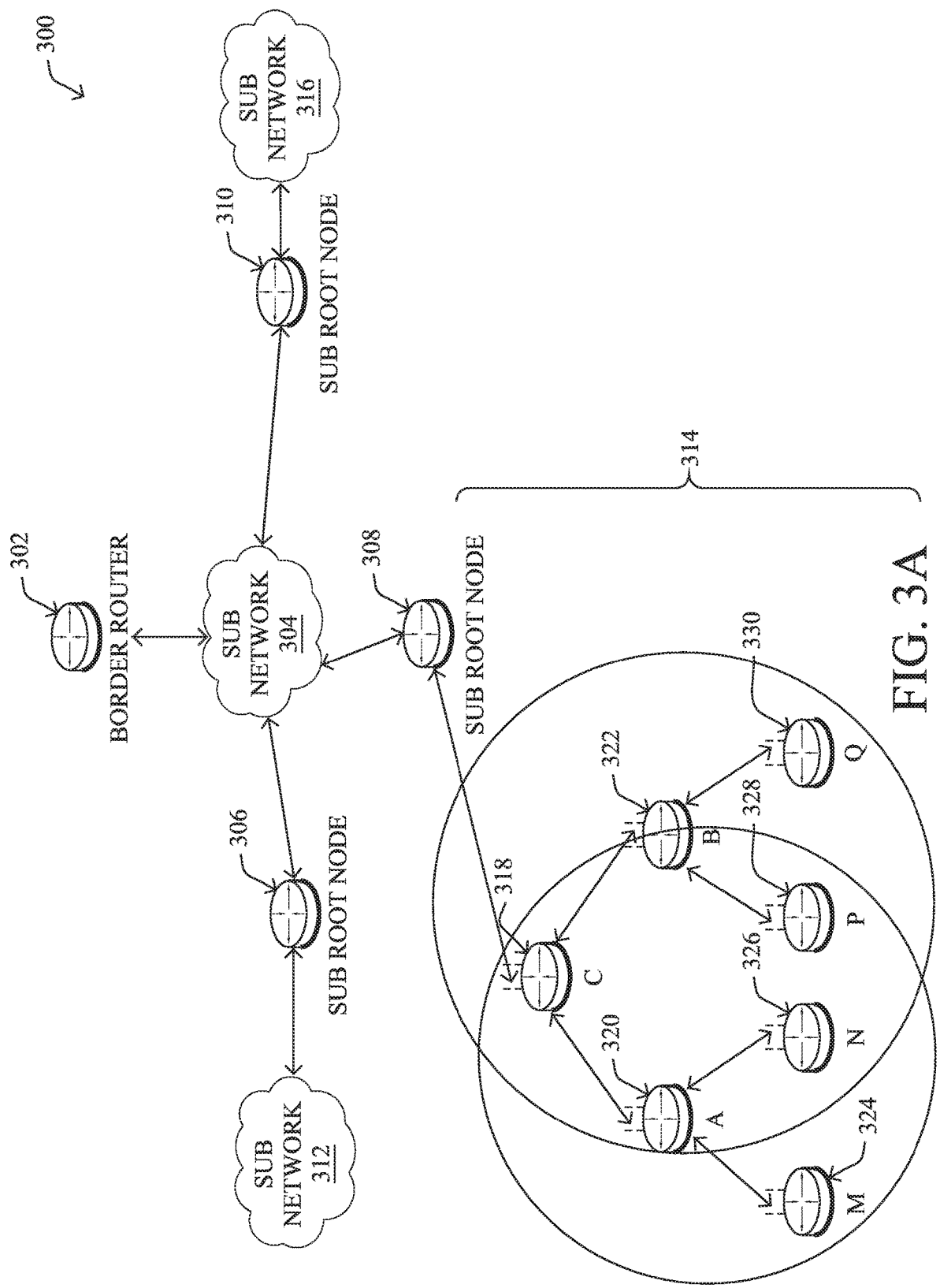
FIGS. 3A-3C illustrate an example network that implements dynamic transmission power in a wireless mesh network using supervised and semi-supervised learning.
Figure 3B:
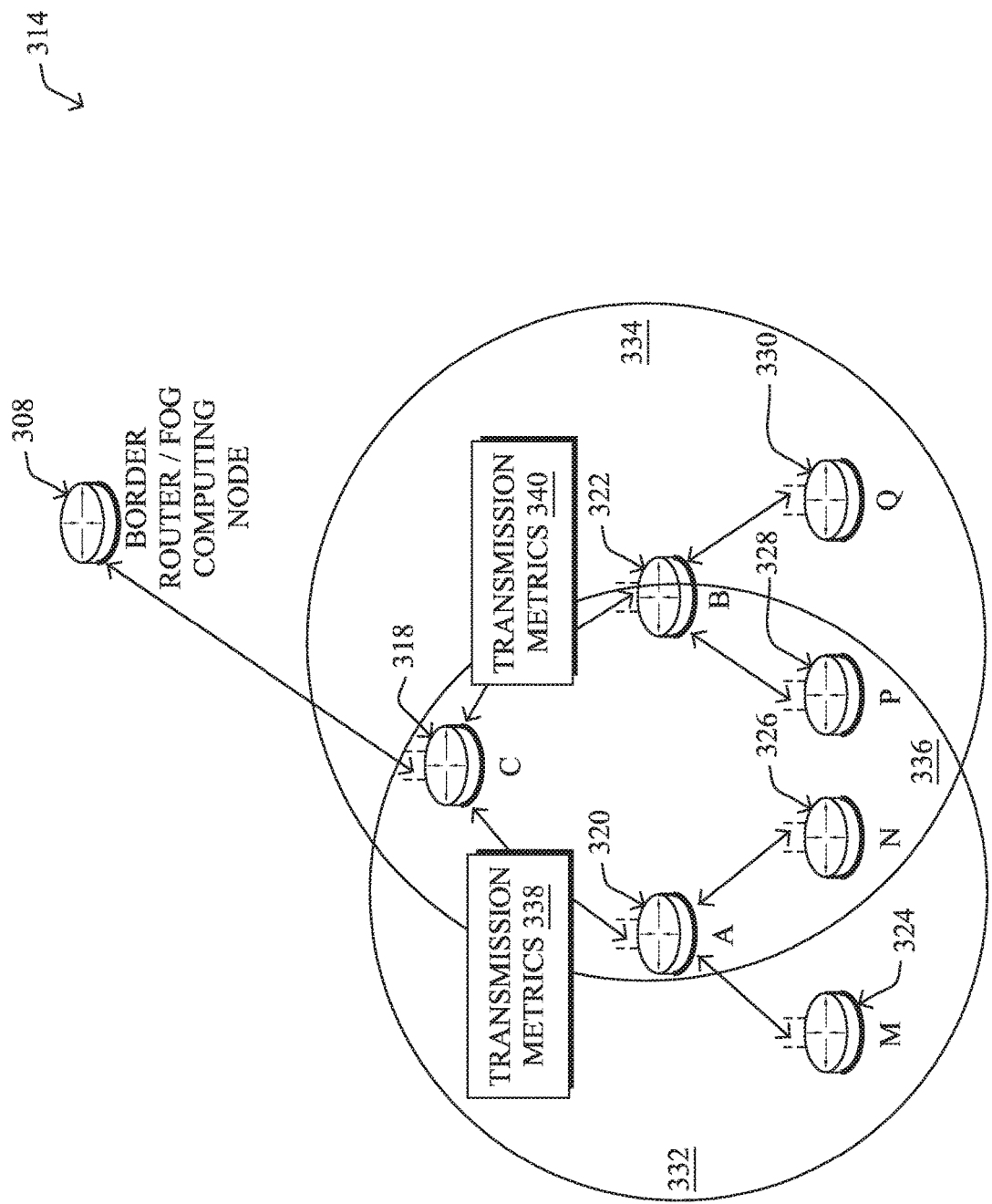
Figure 3C:
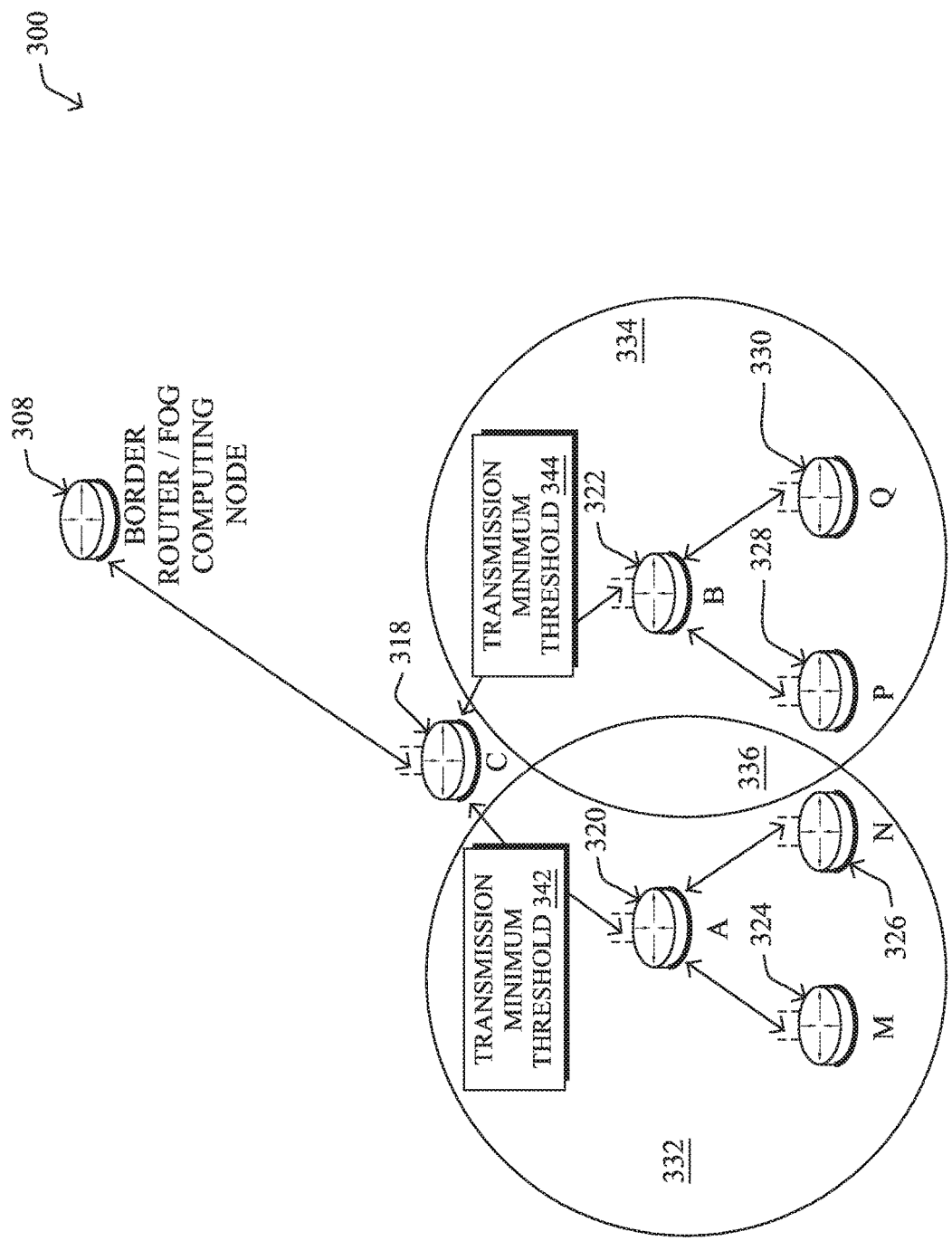

Operationally, consider FIGS. 3A-3C that show a mesh network 300 in one embodiment of the present disclosure.

With reference to FIG. 3A, the network 300 shows an example mesh network which may be utilized in a connected grid type environment with a plurality of devices including, for example, a border router 302 in communication with a sub-network 304 that is in communication with, by way of respectively sub-root nodes (SRNs) 306-310, mesh sub networks 312-316. As shown, an SRN 308 may be in communication with a plurality of devices 318-330. In one embodiment, the border router 302, the SRNs 306-310, and devices of the mesh sub networks 312-316 may communicate using for example, RF links, PLCs links, etc. As will be described in greater detail herein below, it should be understood that the devices of each of the mesh sub networks 312-316 may be any suitable type of objects or nodes, such as for example, smart objects, or "things" as may be contemplated by the Internet of Things concept. In one embodiment, the devices may be configured in a manner suitably similar to the device 200 as described in FIG. 2. In an example embodiment, the plurality of devices 318-330 may be connected to respective advanced metering infrastructure (s). In various embodiments, each of the sub networks 312-316 may include one or more mesh networks, such as, for example, Internet of Things networks.

Turning now to FIG. 3B that shows additional detail recording the mesh sub network 314. In particular, the mesh sub network 314 is shown with a first device 320 being associated with a set of devices 324-326. The first device 320 may communicate with the set of devices 324-326 using a maximum transmission power threshold (as described above in a "default state" or when detaching from another network and joining a new one), thereby leading to a first communication range 332. In addition, as is shown, second device 322 being associated with another set of devices 328-330. The second device 322 may communicate with the other set of devices 328-330 using the maximum transmission power threshold, thereby leading to a second communication range 334. Due to the first communication range 332 and the second communication range 334, a region of overlap 336 in the communications of the first device 320 and the second 322 may occur, which may lead to the interference, collisions, etc. in the communications among the two separate set of associated devices (e.g., the first device 320 and the second device 322).

The first device 320 and the second device 322 may be configured to collect transmission metrics 338-340 that are indicative of network conditions with their respective downlink devices (e.g., devices 324-326 and devices 328-330). The transmission metrics 338-340 may be sent to a fog communication node (FCN) 308, for example an SRN or border router, which is configured perform various supervised and semi-supervised machine learning processes using the transmission metrics 338-340 to determine minimum transmission power thresholds for the first device 320 and the second device 320. It is to be understood that generally, the first device 320, the second device 322, the set of devices 324-326, and the other devices 328-330 may generally not comprise hardware that is capable of directly performing machine learning process due to limited RAM/ROM resources and/or computing capability. The FCN 308 (e.g., the border router 302 or the SRN 308), on the other hand, typically have enough sufficient for machine learning usage. Further, it is to be understood that the FCN 308 may comprise the border router 302 or the SRN 308, where either of these devices receives the transmission metrics 338-340 directly or via multiple-hops across the mesh sub network 314.

With more detail regarding the supervised and semi-supervised machine learning process as well as the transmission metrics 338-340, the FCN 308 may initially perform a supervised machine learning process based on the Bayes' theorem. Notably the machine learning process may comprise a Gaussian Naive Bayes classifier with Laplacian correction. In general, a Bayes' statistical inference (e.g., a probabilistic determination) of an uncertain quantity is the probability distribution that would express one's beliefs about this quantity before some evidence is taken into account. In other words, the probability of a desired event (e.g., transmission power thresholds) depends on the probabilities of relationships with other factors (e.g., network conditions).

The following formula describes the Bayes' theorem:

$$P(c \mid x) = \frac{P(c)P(x \mid c)}{P(x)} = \frac{P(x, c)}{P(x)}$$

In this expression, c represents a situation for random events (e.g., transmission power threshold(s)). Moreover, x represents evidence or condition (e.g., network conditions), which indicates all factors regarding random events. $P(c|x)$ is indicative of the probability of c with x condition (e.g., a posterior probability). $P(c)$ is indicative of the probability of c without considering conditions (e.g., a prior probability). $P(x|c)$ is indicative of the probability of x carries c situation (e.g., a posterior probability). $P(x)$ is indicative of the probability of x (e.g., a prior probability).

The transmission metrics 338-340 may be used as factors representing evidence or conditions (x) for determining transmission power thresholds (c). In particular, the transmission metrics 338-340 collected and determined by the first device 320 and the second device 322 may include:

an expected transmission count (ETX) of neighbors of a device that represents the percentage probability of packets dropping (i.e., if transmission power is down, ETX will increase, and vice versa) and is indicative of throughput;

a latency parameter between a device and neighbors of the device that is used to find a closest neighbor as potential parents or children that are not affected even if transmission range is reduced by tuning down a transmission power;

a distance parameter between the device and the neighbors of the device that is also used to find a closest neighbor as potential parents or children that are not affected even if transmission range is reduced by tuning down a transmission power;

a number of visible neighbors of the device, a received signal strength indicator (RSSI) of the device that is indicative of the signal quality of a link (that affects the percentage probability for packets transmission success (i.e., ETX)), a link quality indicator (LQI) of the device that is indicative of the signal quality of the link (that affects the percentage probability for packets transmission success (i.e., ETX));

a current traffic load status of the device that is a direct measurement of throughput (e.g., average throughput measured in bits per second);

a transmit queue length of the device is indicative of whether there is high probability of congestions which requires additional power for transmission efficiency;

a band type (e.g., U.S. band, Indian band, etc.) of the device that is indicative of transmission requirements of countries, localities, etc. (e.g., India and Qatar may allow use of a closed band with different maximum allowable power thresholds);

a physical link layer mode of the device (e.g., 2 frequency-shift keying (2FSK) or orthogonal frequency-division multiplexing (OFDM)) that is indicative of power requirements of various modulation techniques (e.g., OFDM often has faster data rate up to 800 kbps, which means OFDM node needs higher power than 2FSK for the same coverage area);

a transmission data rate of the device (e.g., as measured in kilobits per second) that is indicative of basic power requirements for respective data rates (i.e., different data rate require different basic power, in general, a node consumes more energy with a faster data rate);

a deployment type of the second device (e.g., indoors, outdoors, etc.) that is indicative coverage ranges (i.e., there different ranges with the same power for different deployment places, for example, the coverage range of indoor node is visibly smaller than outdoor device with the same power);

a temperature measurement of the device measured by a sensor that may be on the devices and is indicative of the effect that temperature may have on transmission power; and a humidity measurement of the device measured by a sensor that may be on the devices and is indicative of the effect that humidity may have on transmission power.

In order to avoid some probabilities that always are zero because of insufficient sample size, Laplacian correction is described as being used. It is contemplated that other correction types may be used. For example, when an RSSI is −78 dbm but there does not exist a sample of transmission power that is 28. Therefore, P(xRSSI=−78|c28) is always zero, but it is not true in practice. So Laplacian correction method is implemented by adding probable amount for both molecule and denominator to make sure that error will not happen.

Turning now to FIG. 3C, the FCN 308 may use these above-described transmission metrics 338-340 as input for a supervised machine learning process configured to determine minimum transmission power thresholds for 342-344, respectively, the set of devices 324-326 and the other set of devices 328-330. As is shown. the first device 320 and the second device 322 may dynamically change the transmission power thresholds for use in the communications, thereby leading to a reduction in the region of overlap 336 in the communications of the first device 320 and the second 322. While the transmission ranges 332-334 may be smaller, the first device and the second 322 still achieve good connectivity with its visible neighbors (e.g., respectively the set of devices 324-326 and the other set of devices 328-330).

Furthermore, after initially receiving the minimum transmission power thresholds for 342-344, the first device 320 and the second device 322 may be configured to at particular intervals of time (e.g., every four minutes) to send updated transmission metrics to the FCN 308. The FCN 308 may use the updated transmission metrics as input to semi-supervised machine learning processes that applies reinforcement learning to identify updated minimum transmission power thresholds to be used by the first device 320 and the second device 322. The semi-supervised machine learning processes may comprise, for example, Q-Learning, learning-rate adjustment, or Markov decision process. With an increasing rounds of transmission power configurations established by the semi-supervised machine learning process, nodes will be sent optimal transmission power. In other words, the results determined by the semi-supervised machine learning processes will be convergence after several rounds of ML calculations.

Figure 4:
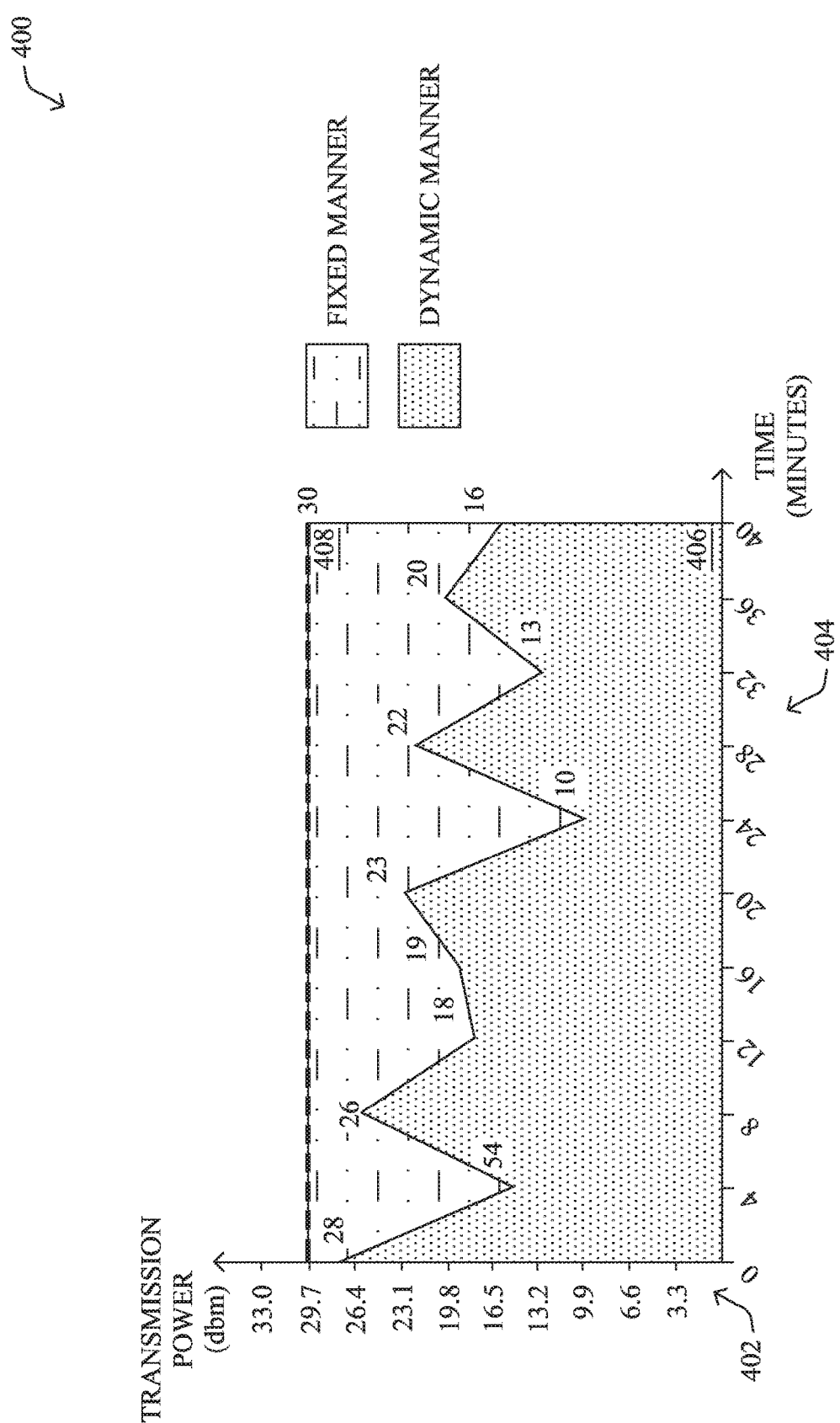
FIG. 4 illustrates an example transmission power chart that shows transmission powers across time.

With reference now to FIG. 4, a transmission power chart 400 showing transmission powers across time 402 for a network (e.g., using a U.S. band like 900 MHz) at a data rate (e.g., 150 kbps) is shown. As is shown, the power used with dynamic transmission power thresholds 406 saves power as compared to the power used when only using a "default" transmission power 408.

Figure 5:
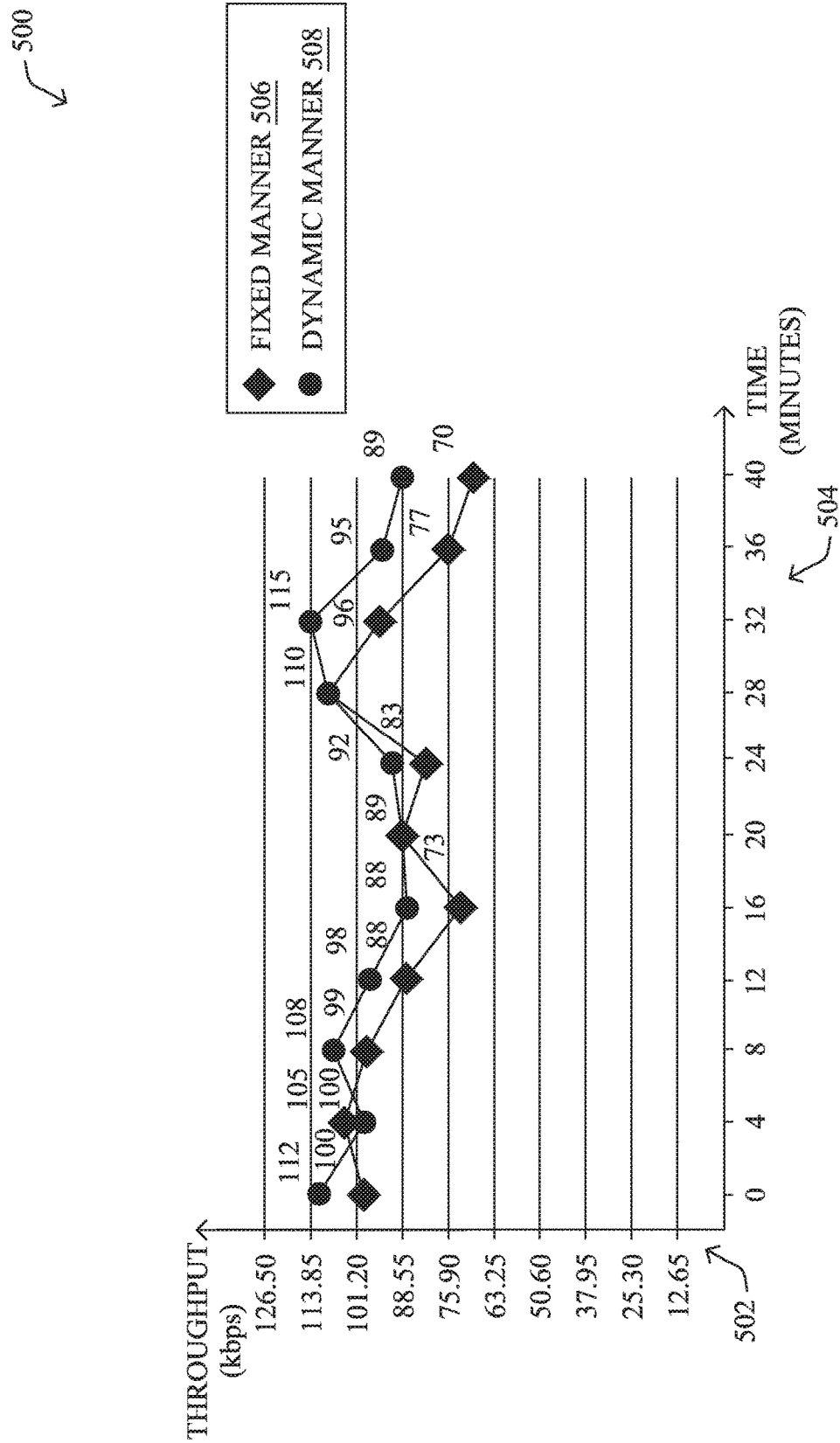
FIG. 5 illustrates an example throughput chart that shows throughput across time.

FIG. 5, which accompanies FIG. 4, is a throughput chart 500 that shows throughput 502 across time 502. As is shown, throughput does not affect by dynamical transmission power adjustment 506. On the contrary, the throughput 506 increases due to low interference risk as compared to throughput using a "default" power transmission power 508.

Figure 6B:
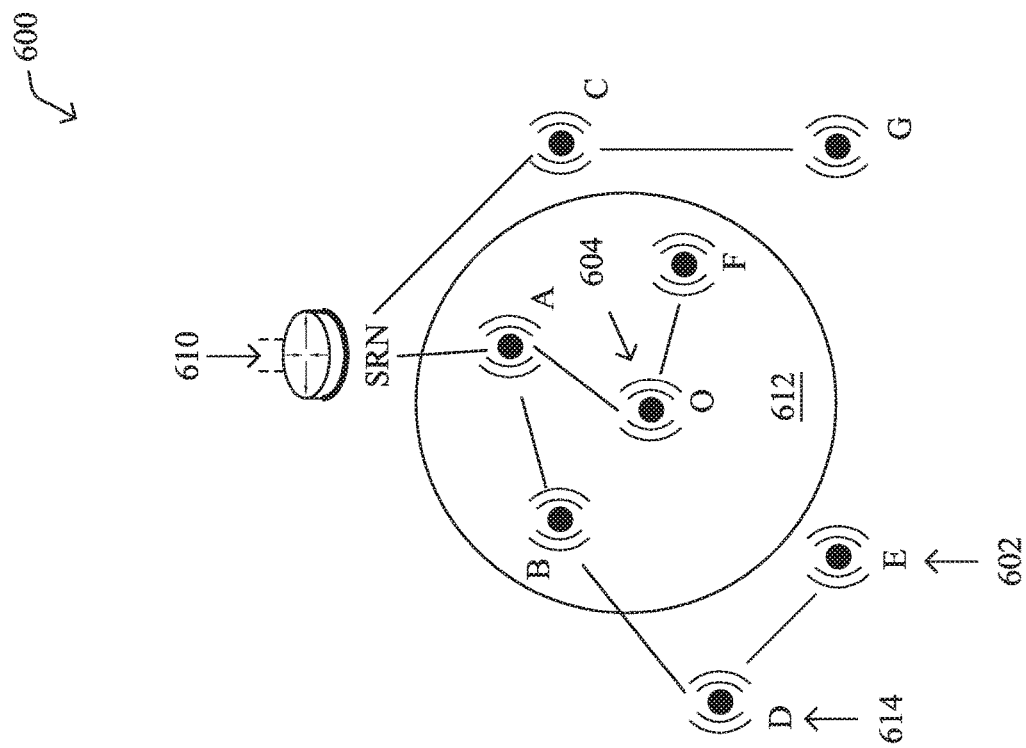
FIGS. 6A-6B illustrate an example mesh network node whose parent device dynamically adjusts its transmission power threshold.
Figure 6A:
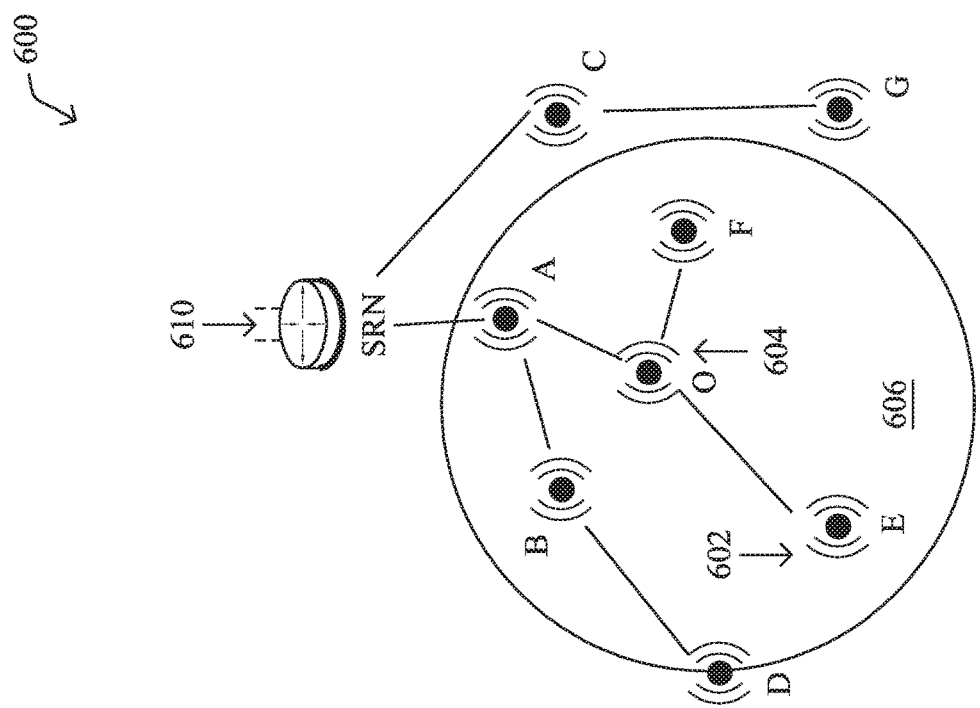

Turning to FIGS. 6A-6B, it is to be understood that a node, after a parent device dynamically adjusts its transmission power threshold to a lower amount, may go out of range of the parent device (i.e., lose its association with the parent device). For example, as in shown FIG. 6A, in an example mesh network 600, a node "E" 602 may initially be associated with a node "O" 604 (e.g., a transmission range 606 of the node "O" covers the node "E"). After the node "O" 604 sends transmission metrics to an FCN, for example an SRN 610, receives an updated transmission power threshold, and applies the updated transmission power threshold, the node "O" 604 may, as shown in FIG. 6B, no longer be in an updated communication range 612 with the node "E" 602. The node "E" may be associated with a node "D" 614 by, for example, referring to its neighbor list.

Figure 7B:
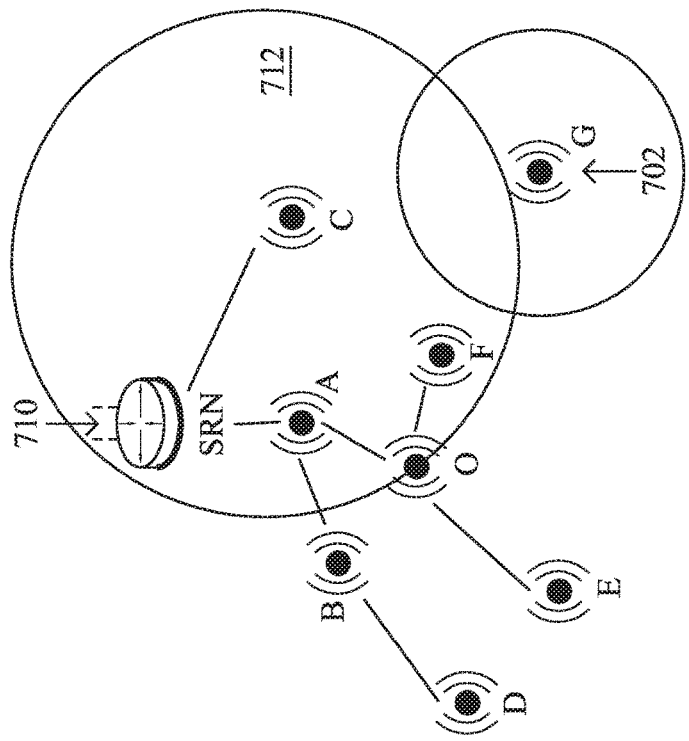
FIGS. 7A-7D illustrate another example mesh network node whose parent device dynamically adjusts its transmission power threshold.
Figure 7A:
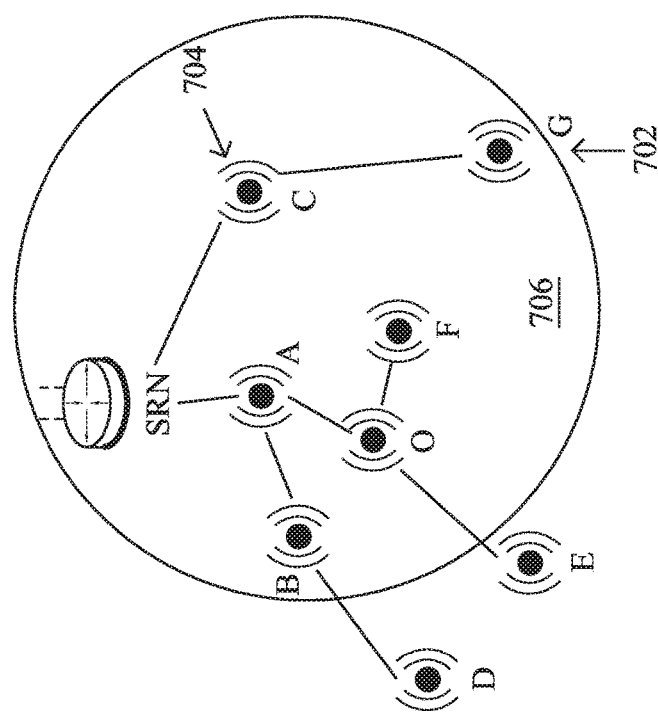

Turning to FIGS. 7A-7D, it is to be understood that a node, after a parent device dynamically adjusts its transmission power threshold to a lower amount, may go out of range of the parent device (i.e., lose its association with the parent device). For example, as in shown FIG. 7A, in an example mesh network 700, a node "G" 702 may initially be associated with a node "C" 704 (e.g., a transmission range 706 of the node "C" covers the node "G"). After the node "C" 704 sends transmission metrics to an FCN, for example an SRN 710, receives an updated transmission power threshold, and applies the updated transmission power threshold, the node "C" 704 may, as shown in FIG. 7B, no longer be in an updated communication range 712 with the node "G" 702.

Figure 7D:
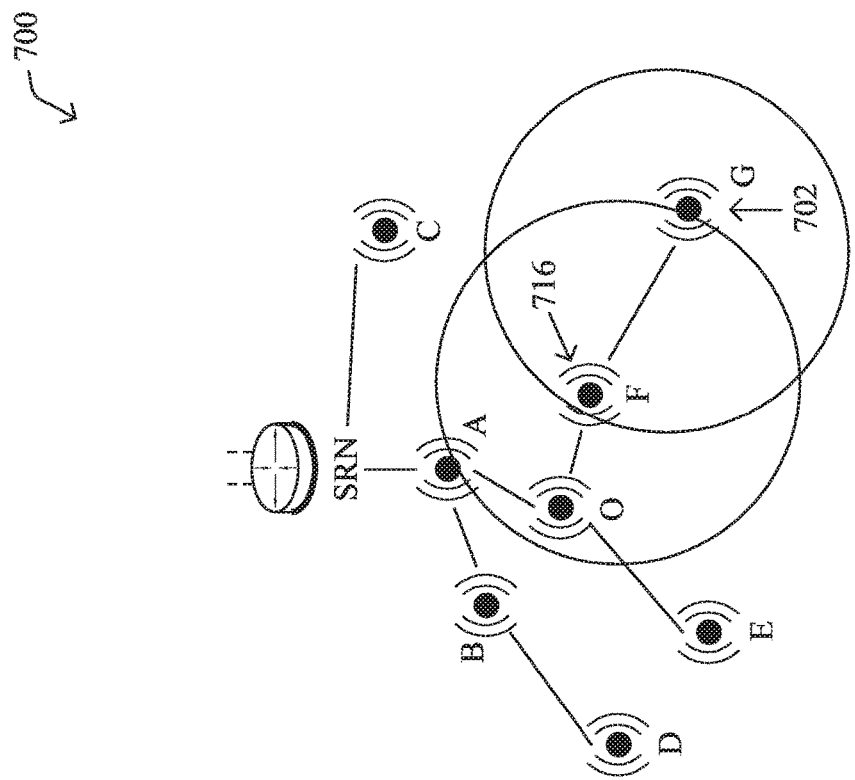
Figure 7C:
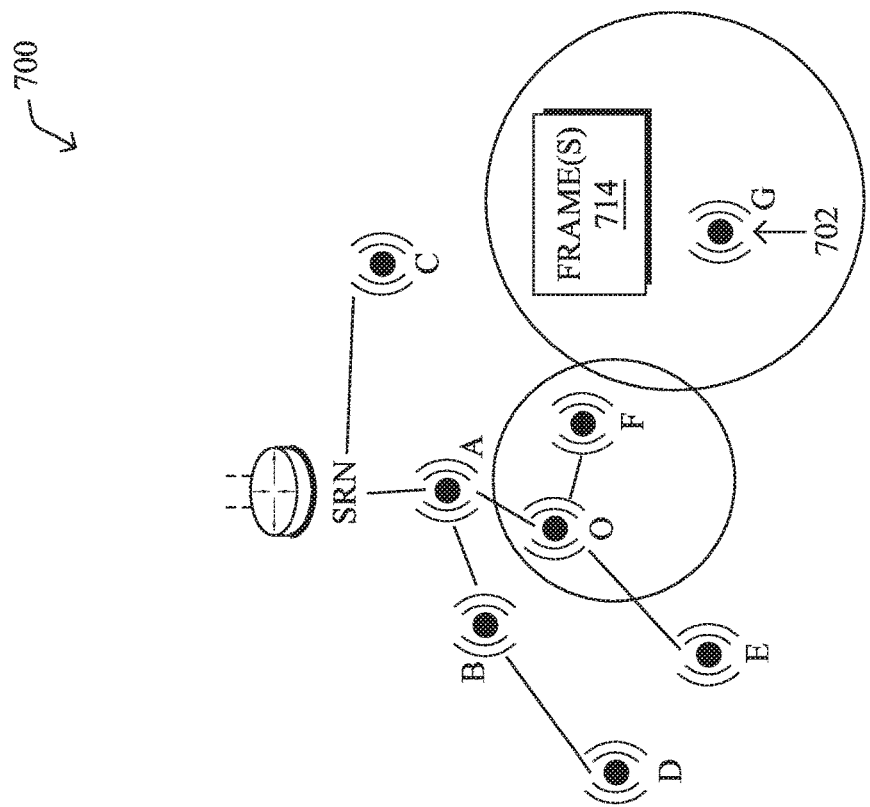

As shown in FIG. 7C, the node "G" 702 may, when it no longer identifies (or finds) any neighbors, begin using its "default" (maximum) transmission power threshold to signal to potential neighbors in the mesh network. In particular, the node "G" 702 may transmit continuous discovery beacon request (DBR) frames 714. In situations where the node "G" 702 is not able of receiving feedback from the potential neighbors (e.g., due TO the potentials neighbors signals being too weak to reach the node "G" 702), an additional parameter (e.g., an amount of DBR from one neighbor) to adjust power for connecting to an orphan node may be implemented. As a result, as is shown in FIG. 7D, the node "G" 702" may associated with a node "F" 716.

Figure 8:
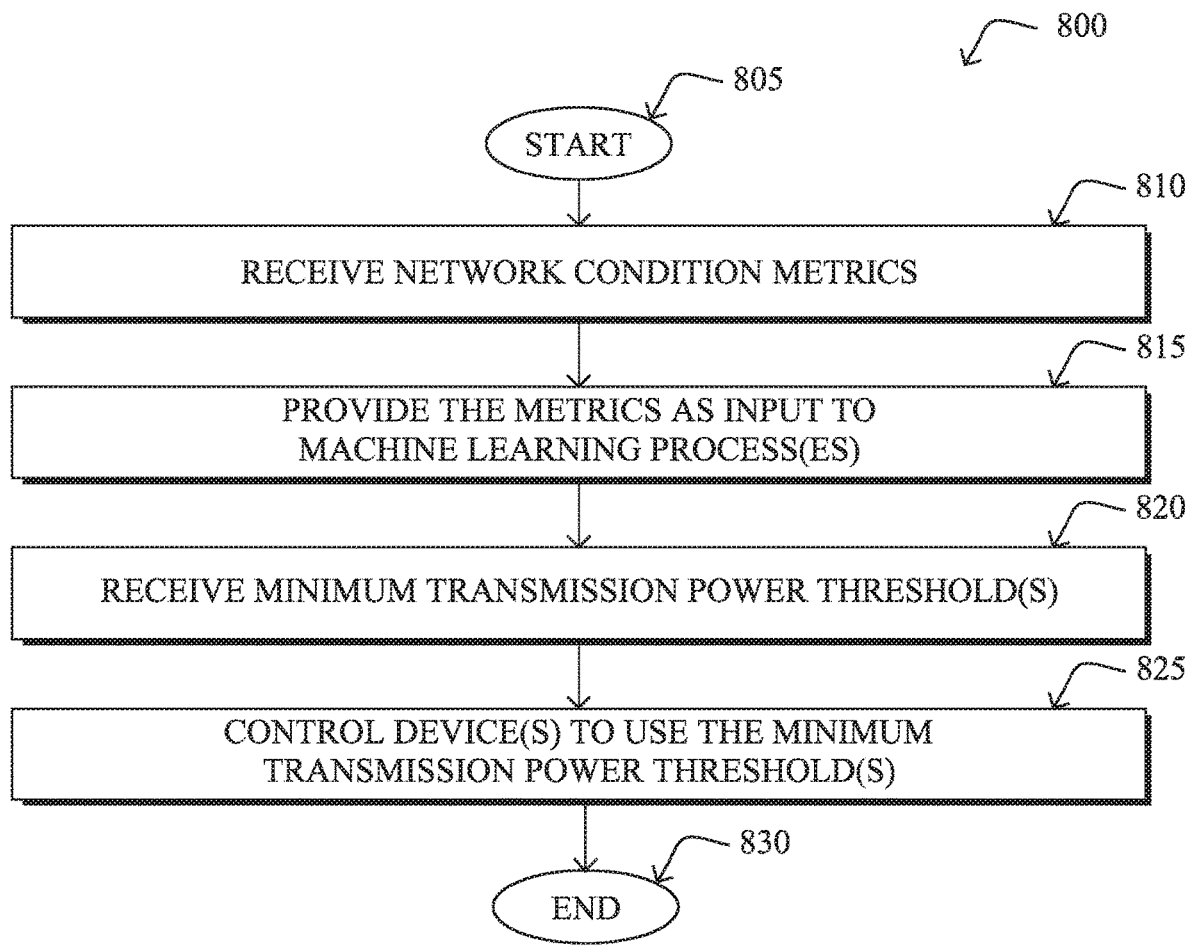
FIGS. 8-9 illustrate example simplified procedures for dynamic transmission power in a wireless mesh network using supervised and semi-supervised learning.
Figure 9:
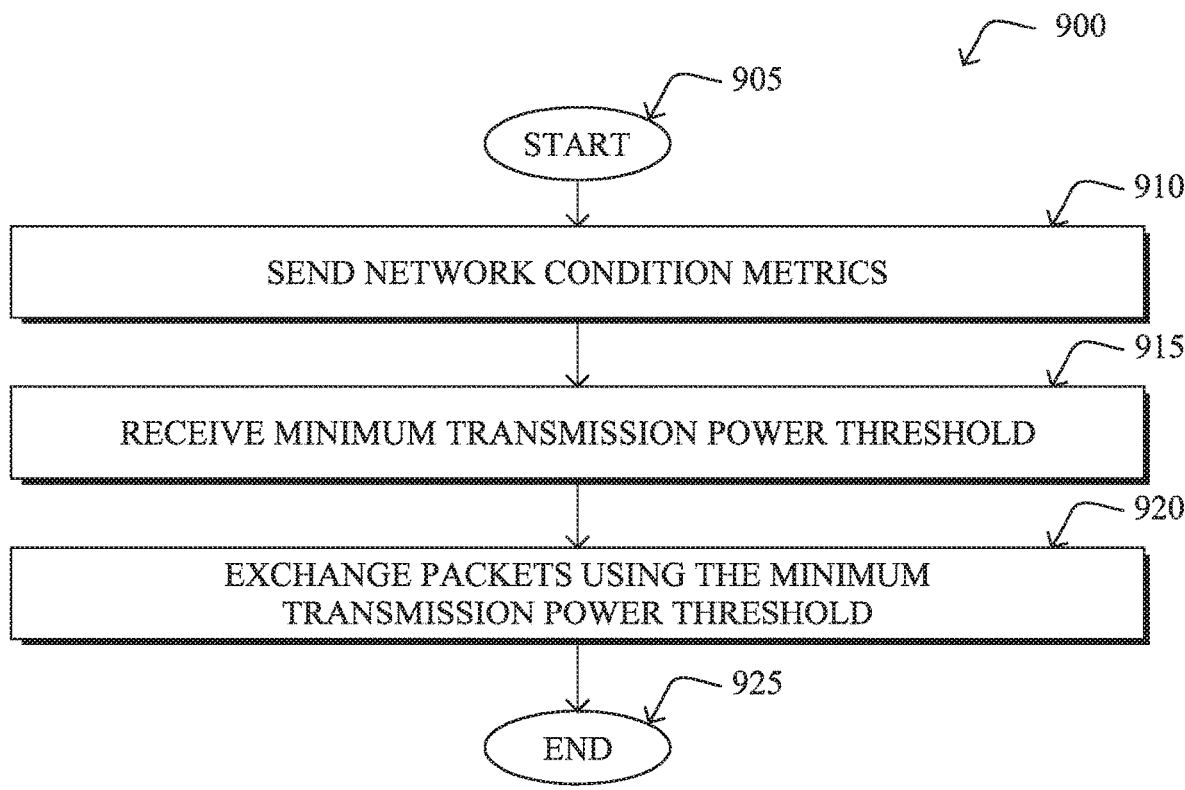

FIGS. 8-9 illustrate example simplified procedures for dynamic transmission power in a wireless mesh network using supervised and semi-supervised learning, in accordance with one or more embodiments described herein. For example, a non-generic, specifically configured device (e.g., device 200) may perform procedures 800-900 by executing stored instructions (e.g., process 248).

With reference to FIG. 8, the procedure 800 may start at step 805, and continues to step 810, where, as described in greater detail above, a device may receive network condition metrics. In particular, a first device of a mesh communication network (e.g., a border router, fog computing node, sub-root node, etc.) may receive a set of transmission power metrics that are indicative of network conditions between a second device of the mesh communication network (e.g., an access point, field area router, parent node, etc.) and a plurality of child nodes that are associated with the second device. The first device may comprise a node of the mesh communication network selected from the group consisting of a fog computing node, a sub-root node, and a border router. The first device may receive the set of transmission power metrics from the second device by way of multiple hops across the mesh communication network The set of transmission power metrics may be measured by the second device using a default transmission power threshold that is greater than a particular minimum transmission power threshold. The transmission power metrics may be selected from the group consisting of an expected transmission count (ETX) of neighbors of the second device, a latency parameter between the second device and neighbors of the second device, a distance parameter between the second device and the neighbors of the second device, a number of visible neighbors of the second device, a received signal strength indicator (RSSI) of the second device, a link quality indicator (LQI) of the second device, a current traffic load status of the second device, a transmit queue length of the second device, a band type of the second device, a physical link layer mode of the second device, a transmission data rate of the second device, a deployment type of the second device, a temperature measurement of the second device, and a humidity measurement of the second device.

At step 815, as described in greater detail above, the device may provide the metrics as input to machine learning process(es). In particular, the first device may provide the set of transmission power metrics as input to a supervised machine learning process that probabilistically determines one or more minimum transmission power thresholds for nodes of the mesh communication network. The supervised machine learning process may comprise a Gaussian Naive Bayes classifier with Laplacian correction.

At step 820, the device may receive minimum power thresholds). In particular, the first device may obtain an output from the supervised machine learning process comprising an indication of a particular minimum transmission power threshold for the second device. It is to be understood that an updated set of transmission power metrics maybe used as input to a semi-supervised machine learning process, where the semi-supervised machine learning process applies reinforcement learning to the one or more minimum transmission power thresholds for the nodes of the mesh communication network. The semi-supervised machine learning process may be selected from the group consisting of Q-Learning, learning-rate adjustment, and a Markov decision process.

At step 825, as detailed above, the device may control device(s) to use the minimum transmission power threshold (s). In particular, the first device may control the second device to exchange one or more packets with the plurality of child nodes using the particular minimum transmission power threshold. The second device may disassociate with at least one child node of a plurality of child nodes. Procedure 800 then ends at step 830.

With reference to FIG. 9, the procedure 900 may start at step 905, and continues to step 910, where, as described in greater detail above, a device may send network condition metrics. In particular, a first device of a mesh communication network (e.g., an access point, field area router, parent node, etc.) may send a set of transmission power metrics that are indicative of network conditions between the first device and a plurality of child nodes of the mesh communication network to the second device. The first device may measure the set of transmission power metrics using a default transmission power threshold that is greater than a particular minimum transmission power threshold. The transmission power metrics may be selected from the group consisting of an expected transmission count (ETX) of neighbors of the first device, a latency parameter between the first device and neighbors of the first device, a distance parameter between the first device and the neighbors of the first device, a number of visible neighbors of the first device, a received signal strength indicator (RSSI) of the first device, a link quality indicator (LQI) of the first device, a current traffic load status of the first device, a transmit queue length of the first device, a band type of the first device, a physical link layer mode of the first device, a transmission data rate of the first device, a deployment type of the first device, a temperature measurement of the first device, and a humidity measurement of the first device.

At step 915, as described in greater detail above, the device may receive a minimum transmission power threshold (e.g., from a border router, fog computing node, sub-root node, etc.). In particular, the first device may receive an indication of a particular minimum transmission power threshold for the first device, wherein the particular minimum transmission power threshold is output of a supervised machine learning process that probabilistically determines one or more minimum transmission power thresholds for nodes of the mesh communication network by using the set of transmission power metrics as input. The supervised machine learning process may comprise a Gaussian Naive Bayes classifier with Laplacian correction.

It is to be understood that an updated set of transmission power metrics maybe used as input to a semi-supervised machine learning process, where the semi-supervised machine learning process applies reinforcement learning to the one or more minimum transmission power thresholds for the nodes of the mesh communication network. The semi-supervised machine learning process may be selected from the group consisting of Q-Learning, learning-rate adjustment, and a Markov decision process.

At step 920, the device may exchange packets using the minimum transmission power threshold. In particular, the first device may exchange one or more packets with the plurality of child nodes using the particular minimum transmission power threshold. In one embodiment, and in certain circumstances as noted above, the first device may also disassociate from at least one child node of the plurality of child nodes. Procedure 900 then ends at step 925.

It should be noted that while certain steps within procedures 800-900 may be optional as described above, the steps shown in FIGS. 8-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-900 are described separately, certain steps from each procedure may be incorporated into each other procedure, and the procedures are not meant to be mutually exclusive.

The techniques described herein, therefore, provide for dynamic transmission power in wireless mesh networks using supervised and semi-supervised learning. In some aspects, a wireless mesh node may be configured to tune (e.g., throttle down) its transmission power threshold in a manner that allows the wireless mesh node to maintain connectivity with child nodes while ensuring adequate throughput (i.e., the same as would be provided when using the maximum transmission power threshold). Consequently, unnecessary energy consumption by the wireless mesh node is reduced and a "cleaner" overall radio environment for a given wireless mesh network may be achieved. Additionally, fog computing provides individual mesh nodes (e.g., endpoint nodes) with limited computing performance in the mesh computing network to offload the computing calculations required for the above-described machine learning processes to nodes, for example, sub-root nodes or border routers, that have the computer performance more well-suited for the machine learning processes.

While there have been shown and described illustrative embodiments that provide for dynamic transmission power in wireless mesh networks using supervised and semi-supervised learning, it is to be understood that various other adaptations and modifications may be made within the intent and scope of the embodiments herein. For example, while certain embodiments are described herein with respect to using certain supervised and semi-supervised machine learning processes, other techniques are contemplated (e.g., nearest neighbor (NN) techniques clustering techniques (e.g., k-means, mean-shift, etc.), neural networks, support vector machines (SVMs), etc.)

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
    receiving, by a first device of a mesh communication network, a set of transmission power metrics that are indicative of network conditions between a second device of the mesh communication network and a plurality of child nodes that are associated with the second device;
    providing, by the first device, the set of transmission power metrics as input to a supervised machine learning process that probabilistically determines one or more minimum transmission power thresholds for nodes of the mesh communication network;
    obtaining, by the first device, an output from the supervised machine learning process comprising an indication of a particular minimum transmission power threshold for the second device; and
    controlling, by the first device and based on the output from the supervised machine learning process, the second device to exchange one or more packets with the plurality of child nodes using the particular minimum transmission power threshold.

2. The method as in claim 1, wherein the set of transmission power metrics are measured by the second device using a default transmission power threshold that is greater than the particular minimum transmission power threshold.

3. The method as in claim 1, wherein the supervised machine learning process comprises a Gaussian Naive Bayes classifier with Laplacian correction.

4. The method as in claim 1, further comprising:
receiving, by the first device and at a predetermined interval of time, an updated set of the transmission power metrics that are indicative of the network conditions between the second device and the plurality of child nodes;
providing, by the first device, the set of transmission power metrics and the updated set of transmission power metrics as input to a semi-supervised machine learning process that applies reinforcement learning to the one or more minimum transmission power thresholds for the nodes of the mesh communication network;
obtaining, by the first device, an output from the semi-supervised machine learning process comprising an indication of an updated minimum transmission power threshold for the second device; and
controlling, by the first device and based on the output from the semi-supervised machine learning process, the second device to exchange additional packets with the plurality of child nodes using the updated minimum transmission power threshold.

5. The method as in claim 4, wherein the semi-supervised machine learning process is selected from the group consisting of Q-Learning, learning-rate adjustment, and a Markov decision process.

6. The method as in claim 1, wherein the transmission power metrics are selected from the group consisting of an expected transmission count (ETX) of neighbors of the second device, a latency parameter between the second device and neighbors of the second device, a distance parameter between the second device and the neighbors of the second device, a number of visible neighbors of the second device, a received signal strength indicator (RSSI) of the second device, a link quality indicator (LQI) of the second device, a current traffic load status of the second device, a transmit queue length of the second device, a band type of the second device, a physical link layer mode of the second device, a transmission data rate of the second device, a deployment type of the second device, a temperature measurement of the second device, and a humidity measurement of the second device.

7. The method as in claim 1, wherein the first device receives the set of transmission power metrics from the second device by way of multiple hops across the mesh communication network.

8. The method as in claim 1, wherein controlling, by the first device and based on the output from the supervised machine learning process, the second device to exchange the packets with the plurality of child nodes using the particular minimum transmission power threshold comprises the second device disassociating with at least one child node of the plurality of child nodes.

9. The method as in claim 1, wherein the first device comprises a node of the mesh communication network selected from the group consisting of a fog computing node, a sub-root node, and a border router.

10. The method as in claim 1, wherein the mesh communication network is a Connected Grid mesh network (CG-Mesh) for Advanced Metering Infrastructure (AMI).

11. A method, comprising:
sending, by a first device of a mesh communication network that is associated with a plurality of child nodes, a set of transmission power metrics that are indicative of network conditions between the first device and the plurality of child nodes to a second device of the mesh communication network;
receiving, by the first device, an indication of a particular minimum transmission power threshold for the first device, wherein the particular minimum transmission power threshold is output of a supervised machine learning process that probabilistically determines one or more minimum transmission power thresholds for nodes of the mesh communication network by using the set of transmission power metrics as input; and
exchanging, by the first device, one or more packets with the plurality of child nodes using the particular minimum transmission power threshold.

12. The method as in claim 11, further comprising:
measuring, by the first device, the set of transmission power metrics using a default transmission power threshold that is greater than the particular minimum transmission power threshold.

13. The method as in claim 11, wherein the supervised machine learning process comprises a Gaussian Naive Bayes classifier with Laplacian correction.

14. The method as in claim 11, further comprising:
sending, by the first device and at a predetermined interval of time, an updated set of the transmission power metrics that are indicative of the network conditions between the first device and the plurality of child nodes to the second device;
receiving, by the first device, an indication of an updated minimum transmission power threshold for the first device from the second device, wherein the updated minimum transmission power threshold is output of a semi-supervised machine learning process that applies reinforcement learning to the one or more minimum transmission power thresholds; and
exchanging, by the first device, additional packets with the plurality of child nodes using the updated minimum transmission power threshold.

15. The method as in claim 14, wherein the semi-supervised machine learning process is selected from the group consisting of Q-Learning, learning-rate adjustment, and a Markov decision process.

16. The method as in claim 11, wherein the transmission power metrics are selected from the group consisting of an expected transmission count (ETX) of neighbors of the first device, a latency parameter between the first device and neighbors of the first device, a distance parameter between the first device and the neighbors of the first device, a number of visible neighbors of the first device, a received signal strength indicator (RSSI) of the first device, a link quality indicator (LQI) of the first device, a current traffic load status of the first device, a transmit queue length of the first device, a band type of the first device, a physical link layer mode of the first device, a transmission data rate of the first device, a deployment type of the first device, a temperature measurement of the first device, and a humidity measurement of the first device.

17. The method as in claim 11, wherein the first device sends the set of transmission power metrics to the second device by way of multiple hops across the mesh communication network.

18. The method as in claim 11, wherein exchanging, by the first device, one or more packets with the plurality of child nodes using the particular minimum transmission power threshold comprises:

disassociating, by the first device, from at least one child node of the plurality of child nodes.

19. The method as in claim 11, wherein the second device comprises a node of the mesh communication network selected from the group consisting of a fog computing node, a sub-root node, and a border router.

20. An apparatus, comprising:

a processor;

a transceiver configured to communicate in a mesh communication network; and a memory configured to store a process executable by the processor, the process when executed by the processor operable to:

receive a set of transmission power metrics that are indicative of network conditions between a device of the mesh communication network and a plurality of child nodes that are associated with the device;

provide the set of transmission power metrics as input to a supervised machine learning process that probabilistically determines one or more minimum transmission power thresholds for nodes of the mesh communication network;

obtain an output from the supervised machine learning process comprising an indication of a particular minimum transmission power threshold for the device; and control, based on the output from the supervised machine learning process, the device to exchange one or more packets with the plurality of child nodes using the particular minimum transmission power threshold.

* * * * *